United States Patent [19]

Dohm, Jr.

[11] 4,179,987

[45] Dec. 25, 1979

[54] SAFETY APPARATUS FOR A BACON PRESS OR THE LIKE

[75] Inventor: Daniel Dohm, Jr., University City, Mo.

[73] Assignee: Cashin Systems Corp., Long Island, N.Y.

[21] Appl. No.: 908,536

[22] Filed: May 22, 1978

[51] Int. Cl.² .......................... B30B 15/32; F16P 7/00
[52] U.S. Cl. ............................ 100/53; 100/DIG. 10; 100/218; 74/616; 192/133
[58] Field of Search ................. 100/DIG. 10, 53, 218; 74/612, 616; 425/152; 83/544; 192/133, 134, 135, 129 B, 130, 137

[56] References Cited

U.S. PATENT DOCUMENTS

| | | | |
|---|---|---|---|
| 2,724,287 | 11/1955 | Knoth | 74/616 |
| 3,213,992 | 10/1965 | Gustafson | 100/53 |
| 3,901,140 | 8/1975 | Dohm | 100/53 |
| 3,987,881 | 10/1976 | Perkins | 100/53 |

FOREIGN PATENT DOCUMENTS

| | | | |
|---|---|---|---|
| 220724 | 3/1959 | Australia | 100/53 |
| 2516293 | 10/1976 | Fed. Rep. of Germany | 100/53 |

Primary Examiner—Billy J. Wilhite
Attorney, Agent, or Firm—Koenig, Senniger, Powers and Leavitt

[57] ABSTRACT

Safety apparatus for a bacon press or the like including a transparent safety door movable vertically between a raised retracted position in which a slab of bacon or other work to be pressed may be readily placed in the press and in which a pressed slab of bacon or the like may be removed from the press, and a lowered position in which access to the movable parts of the press is blocked. Movement of the safety door from its raised to its lowered position initiates operation of the press. Partial opening of the door during operation of the press immediately stops the press. The door is automatically raised at the end of an operating cycle of the press. The safety apparatus also includes the provision of safety screens which may be readily raised and locked in their raised position to permit access to the press and which may be readily lowered.

10 Claims, 6 Drawing Figures

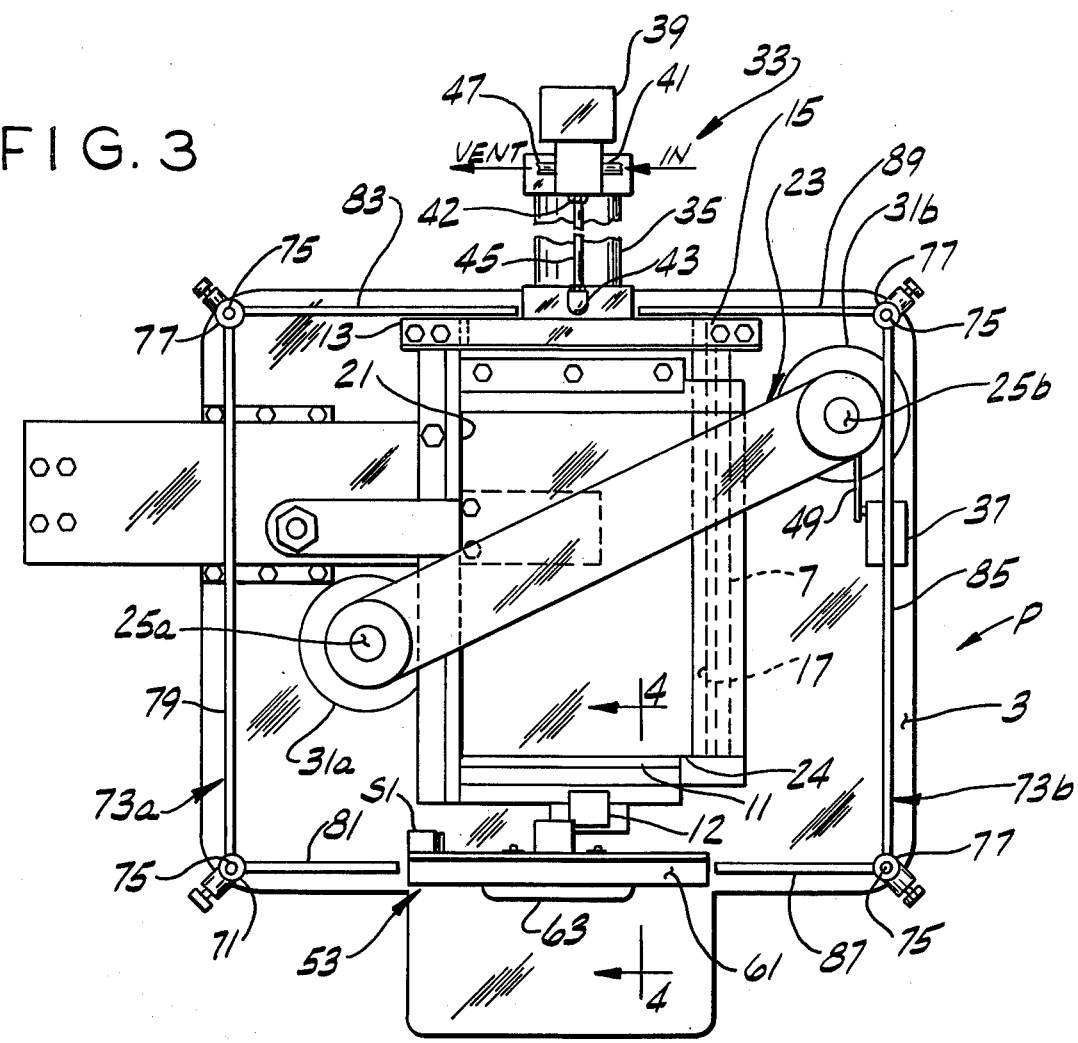

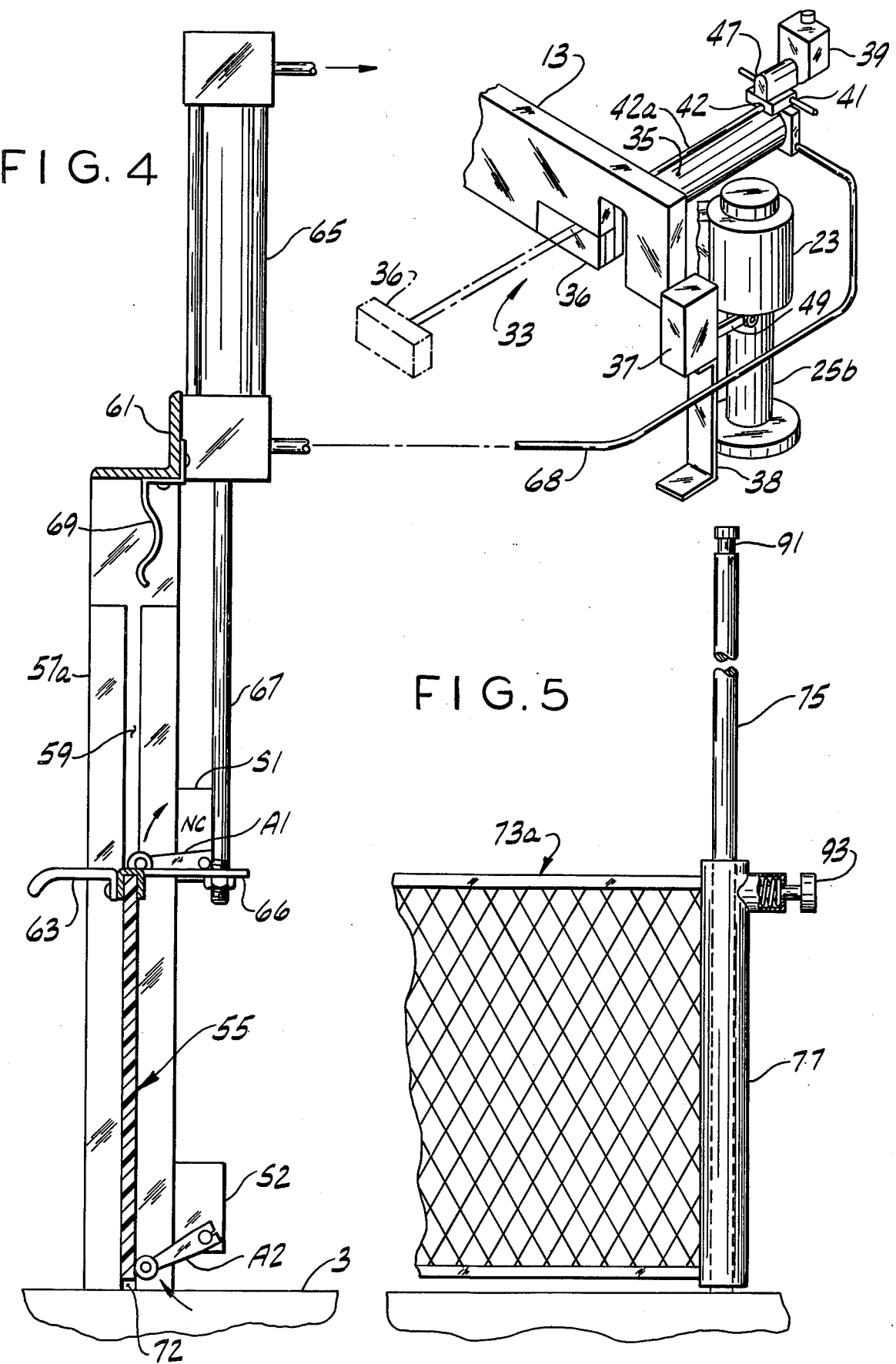

SAFETY APPARATUS FOR A BACON PRESS OR THE LIKE

BACKGROUND OF THE INVENTION

This invention relates to safety apparatus for a bacon press or the like.

As disclosed in the inventor's prior coassigned U.S. Pat. Nos. 2,850,966, 3,146,697 and 3,901,140, bacon presses are well known which have an expansible and contractible bacon compressing and molding chamber defined by six platens movable relative to one another. A side or slab of bacon may be compressed and molded in the press heightwise, laterally and endwise to assume a more uniform thickness and regular shape so that it may be readily sliced to yield a greater number of slices of uniform size and weight with less waste than with unpressed bacon slabs.

In the operation of manually loaded and operated presses, such as shown in the above-mentioned U.S. Pat. No. 3,901,140, the operator places a slab of bacon in the open platens of the press and manually operates a pair of valves or switches (one with one hand, the other with the other hand) to operate the press. Typically, these valves are so-called "dead man" valves, which must be manually held open for operation of the press. If one or both of these valves is released at any time during operation of the press, the press will instantaneously stop. Once in operation, the press cycles relatively rapidly completing a pressing cycle in a few seconds and the platens close with great force. In most instances, the requirement for holding both valves open for operation of the press keeps both hands of the operator out of the press during its operation to avoid injury to the operator, but press operators have been known to hang a weight on one of the dead man valves so as continuously to hold it open and to enable them to operate the press with one hand instead of two, with attendant danger. Also, if the dual dead man valves are properly used, the operator was not free to do other tasks, such as preparing to insert the next bacon slab, while the press was in operation.

SUMMARY OF THE INVENTION

Among the several objects of this invention may be noted the provision of safety apparatus including a safety door or gate adapted for use with a variety of presses, such as bacon presses as above described, which prevents operation of the press when in any position but its closed position and which automatically initiates operation of the press when closed; the provision of such a safety door which does not restrict access to the press when open and which does not substantially block the operator's view of the press when closed; the provision of such a safety door which is manually released to drop virtually of its own weight to close with little effort on the part of the operator; the provision of such a safety door which is automatically raised upon completion of or momentarily prior to completion of an operating cycle of the press; the provision of such a safety door which will not unduly injure the operator if it should inadvertently be closed on the operator's hand and which will not permit operation of the press so long as the operator's hands or fingers prevent the full closure of the safety door; the provision of such safety apparatus which includes guards or screens extending from one side of the safety door around the press to the other side of the safety door so as to substantially enclose the moving parts of the press and to prevent access thereto; the provision of such safety guards which may be readily raised and locked in a raised position so as to facilitate cleaning and repair of the press, and which may be readily lowered; the provision of such a safety gate which will instantaneously interrupt the operation of the press and open the platens of the press upon the safety door being moved from its fully closed position; the provision of such a safety door which is reliable in operation; and the provision of such safety apparatus which is of rugged and sanitary construction and which may be readily cleaned.

Briefly, safety apparatus of this invention is intended for use on a press or other machine having one or more parts movable during operation of the press, these movable parts being capable of causing injury to the operator of the press in the event the operator inadvertently leaves his hands or other parts of his body in position where they may be struck by the movable parts during operation of the press. The apparatus comprises a door positioned between the movable parts of the press and the operator when the latter is in his normal position while operating the press, the door being movable between an open position in which the operator has access to the movable parts of the press for placement or removal of work from the press and a closed position in which access to the movable parts of the press is blocked. The apparatus further comprises means actuable by the door upon the door being moved to its closed position for initiating operation of the press and actuable by movement of the door from its closed position for terminating operation of the press, and means for raising the door upon completion of an operating cycle of the press.

Other objects and features of the invention will be in part apparent and in part pointed out hereinafter.

BRIEF DESCRIPTION OF THE DRAWINGS

FIG. 3 is an enlarged plan view of the press as shown in FIG. 2;

FIG. 4 is an enlarged section taken generally on line 4—4 of FIG. 2 showing in cross-section the safety door in its lowered position and showing a vertical track in which one side edge of the door is slidably mounted for movement between its raised and lowered position, also showing certain pneumatic circuitry;

FIG. 5 is an enlarged side elevation of a portion of the safety screen; and

FIG. 6 is a partial diagrammatic illustration of the electrical and hydraulic systems of a press showing how the safety door of this invention is interconnected therewith so as to initiate operation of the press upon closure of the door and instantaneously to terminate operation of the press upon moving the safety door from its fully closed position.

Corresponding reference characters indicate corresponding parts throughout the several views of the drawings.

DESCRIPTION OF PREFERRED EMBODIMENTS

Figure 1:
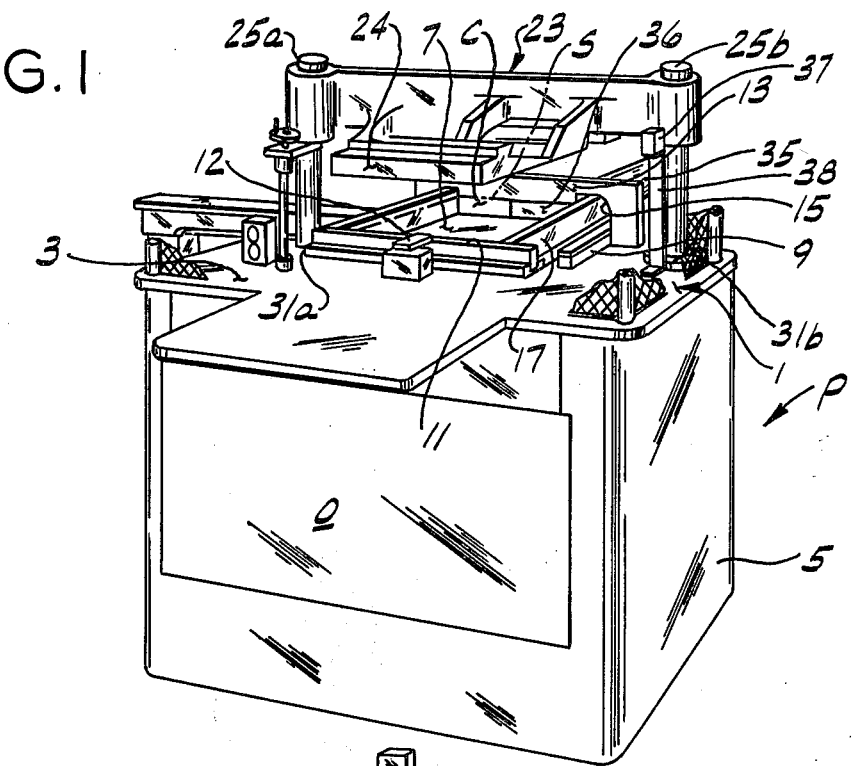
FIG. 1 is a perspective of a bacon press to which safety apparatus of this invention is applied, the press being similar to that disclosed in U.S. Pat. No. 3,901,140, certain parts of the safety apparatus being broken away.

Referring now to the drawings, a bacon press, indicated in its entirety at P, compresses and molds bacon slab S (shown in phantom in FIG. 1) for heightwise, lateral, and endwise compression of the bacon slab. Press P is generally similar to the press as shown in the aforementioned U.S. Pat. Nos. 2,850,966, 3,146,697, and 3,901,140, comprising a fixed bed 1 including a top plate 3 on a cabinet 5. The operator stands at the front of the machine for operation of the press at an operator's position or station O.

At 7 is indicated a bottom platen which is slidably movable on top plate 3 in fore and aft direction by means of a hydraulic cylinder (not herein shown, but fully described in the above-mentioned U.S. Pat. No. 3,901,140) located below the top plate within the cabinet. This bottom platen is guided and retained on top plate 3 by gibs 9. A forward end platen 11 is kept in close contact and in front of side platen 21 by a roller cam on the end of it so the assembly it is mounted in can be either pushed or pulled by the movement of the platen 21 as this slideable assembly is held in place by a gib fitted in a groove in the bottom of and at the front end of the bottom platen. The platen 11 is depressible downwardly in a manner as will appear by an actuator 12 to a retracted or displaced position substantially clear of the front end of the bottom plate for a purpose that will appear. At 13 is indicated a stationary end abutment fixed to the top plate 3 at the rear edge thereof. This stationary end abutment is notched as indicated at 15 to accommodate a side platen 17 carried by bottom platen 7 and to allow both to slide fore and aft therebelow. Forward end platen 11 is movable rearwardly with the bottom platen toward the stationary end abutment or platen 13 for endwise compression of a bacon slab S between platen 11 and platen 13. Side abutment 17 is carried by bottom platen 7 and is movable front to rear along with the bottom platen. Side abutment 17 is fixed against lateral movement relative to the bottom platen. Notch 15 in platen 13 allows the side platen 17 to slide with the bottom platen. At 21 is indicated a pressure-applying side platen which extends parallel to the first-mentioned side platen 17 and which is mounted for movement from a sidewise retracted position (shown in FIGS. 1 and 3) to a compressing position (not shown) toward side abutment 17 by means of a hydraulic cylinder (not shown herein but fully described in the co-assigned U.S. Pat. No. 2,850,966) for lateral compression of the bacon slab S between platens 17 and 21.

Front platen 11 may be moved to a retracted position below the upper face of bottom platen 7 by actuator 12, the platen moving downwardly into a groove in an assembly mounted at the forward end of the bottom platen in a manner disclosed in co-assigned U.S. Pat. No. 3,146,697. The extended platen 11 may also be moved sidewise relative to the bottom platen by the movement of left side platen 21 when it is actuated by a hydraulic cylinder similar to that shown in the above-mentioned U.S. Pat. Nos. 2,850,966 and 3,901,140 from a compressing position in which it is positioned in the front of the rear platen to a retracted position. When platen 11 is moved downwardly, it allows endwise ejection of a compressed slab S of bacon from the molding chamber.

At 23 is indicated a press head mounted for vertical movement toward and away from the top plate 3 of the press. The press head includes a top platen 24 located above bottom platen 7, the head being fixed on the upper ends of a pair of piston rods 25a, 25b which extend up from a pair of hydraulic cylinders (not shown) within cabinet 5 and which effect up and down movement of the upper platen for heightwise compression of the bacon slab S. Piston rods 25a, 25b extend up from plate 3 through respective cylinder guides 31a, 31b fastened to the plate. Front platen 11 and side platen 17 are each vertically depressible into respective grooves in assemblies attached to bottom platen 7 when contacted by the upper platen 24 and are thus moved downwardly when the upper platen is lowered to compress a bacon slab, being biased upwardly by springs (not shown). Thus, bottom platen 7, fixed abutment or platen 13, front platen 11, side platens 17 and 21 and top platen 24 define a contractible and expansible, molding chamber C in which a slab S of bacon may be molded and compressed heightwise, laterally and endwise.

Reference may be made to the above-mentioned U.S. Pat. Nos. 2,850,966 and 3,146,697 for a detailed description of various means for moving bottom platen 7 fore and aft to compress slabs S endwise, for moving side platen 21 laterally to compress the slab, and for moving top platen 24 for vertically compressing the slab. Typical hydraulic and electric circuits for actuating these means are also described in the above-mentioned patents.

Stationary rear abutment or platen 13 is provided with a recessed opening therein adjacent bottom platen 7. An ejector mechanism, indicated in its entirety at 33 in FIGS. 3 and 4, is secured to the rear base of abutment 13 adjacent the opening therein. Ejector mechanism 33 is shown to comprise a fluid power unit or air cylinder 35 having a piston or push rod with a pusher ejector plate 36 (see FIG. 4) affixed to its outer end. The pusher plate is substantially the same size and shape as an opening in stationary abutment 13, fitting flush therein when the pusher plate is in a retracted position with its front face in the same plane as the front or inner face of the rear abutment, so as to form a portion of the rear abutment and to effect endwise compression of slab S in chamber C when the bottom platen is moved rearwardly. Air cylinder 35 is operated to extend its push rod at a controlled rate of movement thus to move the push plate from a retracted position in which the push plate is received in its opening within the rear abutment member (flush with the inner face of the abutment member) into chamber C and to slide it across the upper face of bottom platen 7 to a forward slab ejecting position (shown in phantom in FIG. 4) within chamber C. After a predetermined length of time, air cylinder 35 is actuated to return the push plate to its retracted position. The construction and operation of this ejector mechanism is more fully described in the above-mentioned co-assigned U.S. Pat. No. 3,901,140.

Movement of pusher plate 36 is automatically controlled in timed relation to movement of press head 23 during operation of the press. More particularly, a switch 37 is supported by a bracket 38 on top plate 3 adjacent piston rod 25b (as shown in FIGS. 1, 3 and 4) for actuation by press head 23 as the latter is raised and lowered. A three-way solenoid air valve 39 is provided having inlet port 41 which is connected to a compressed air source, a first transfer port (not shown) connected to an inlet port in the cap end of air cylinder 35 for admitting compressed air into the air cylinder so as to extend its piston or push rod and alternatively venting air for retraction of the rod, a second transfer port 42 connected as indicated at 42a to a port 43 in the rod end of the air cylinder via a line 45 for admitting compressed air to the rod end of air cylinder 35 so as to retract its piston rod and alternatively venting it for extension of the rod, and a vent port 47 for venting air either from the rod or cap end of the air cylinder. Solenoid valve 39 is provided with a timer which, after energization of the solenoid valve, admits pressurized air into the cap end of the air cylinder and vents its other end for extending the push rod and pusher plate 36 to their stated ejecting positions and, after a time sufficient to allow the push plate to reach its ejecting position, deenergizes the solenoid valve so as to shift its spool to vent the cap end of the air cylinder and admit compressed air into the rod end of the air cylinder port 42, thereby to retract the push plate 36 to its retracted position.

More particularly, switch 37 is shown to have an actuating arm 49 (see FIG. 3) positioned adjacent piston rod 25b so as to be engaged by press head 23 as the latter is raised and lowered. It will be understood that switch 37 is electrically connected to solenoid valve 39 in conventional manner so as to operate the solenoid valve 39.

In accordance with this invention, safety apparatus, as generally indicated at 53, is provided to substantially enclose the moving parts (the platens) of press P so as to prevent injury to the press operator or to other personnel during operation of the press. This includes a safety door indicated at 55 positioned between the movable parts of the press and the operator when the operator is in his normal operating position. The safety door is movable between a lowered closed position (as shown in FIG. 4) in which it blocks access to compression chamber C and to the other movable parts of the press, and a raised open position (as shown in FIG. 2) in which the press operator has access to the compression chamber so as to enable him readily to place a bacon slab S therein, and so as to enable ejector mechanism 33 at least partially to eject a compressed slab from the compression chamber.

Door 55 is shown to be a rectangular plate of tough, shatter-proof transparent sheet material, e.g., clear acrylic plastic such as sold under the trademark PLEXIGLAS. The door is vertically movable between its raised and lowered positions in a pair of vertical track guide members 57a, 57b, one at each side of the door. Each of these track members has a vertical guide groove 59 in which the side edges of the door slide. The tops of members 57a, 57b are joined by a rigid cross member 61. Door 55 has a handle 63 secured to its upper edge at the center.

Figure 2:
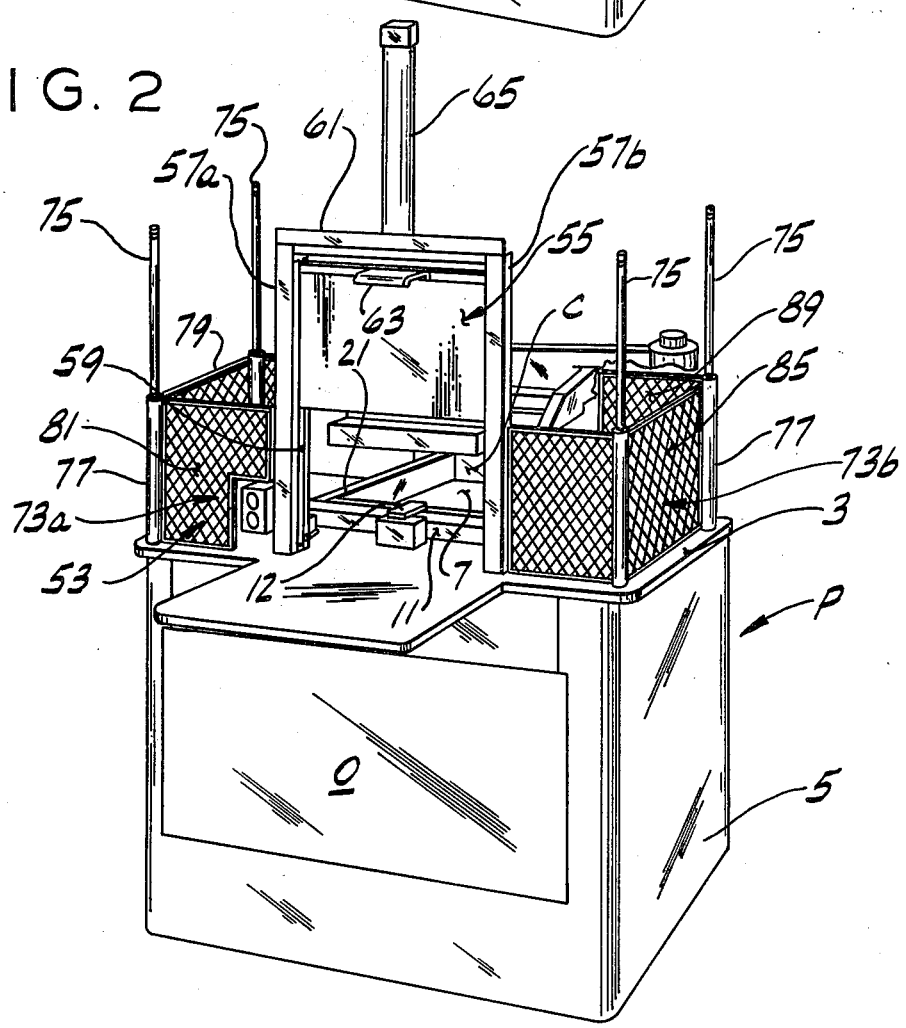
FIG. 2 is a front perspective view of the bacon press shown in FIG. 1 having a safety door and safety guard or screen of the present invention enclosing certain movable parts of the press, the door being shown in its open position.

As shown in FIGS. 2 and 4, an air cylinder unit 65 carried by cross member 61 has a vertically movable piston rod 67 secured to the upper end of the door as indicated at 66. The rod end port of this air cylinder unit is connected to the first transfer port (not shown) of air solenoid valve 39 by a line 68 (see FIG. 4) so that upon energization of this valve to actuate ejection cylinder 35 for ejection of a slab, the door lift air cylinder unit is actuated to raise the door. In this manner, the door is automatically raised at the completion of (or slightly prior to the completion of) an operating cycle of press P so as to insure that a slab S ejected by ejector mechanism 33 may be ejected (or partially ejected) from compression chamber C without interference with the door.

As indicated at 69, a spring latch is provided on cross member 61 for releasably latching the door in its raised position after air pressure is vented from air cylinder unit 65. To close the door, the press operator manually pulls the door down by the handle. The pull releases the door from the latch and it virtually falls of its own weight. Since air cylinder unit 65 is not under pressure, the door is free to move down. It will be understood that means other than a spring latch may be used to hold the door open. For example, a magnet may be used magnetically to grip the door handle and hold the door in its raised position.

Further in accordance with this invention, safety door 55 is interconnected with the electrical and hydraulic systems of press P so as automatically to initiate an operating cycle of the press upon fully closing the door and instantaneously to terminate operation of the press at any time during operation of the press when the door is even partly lifted from its fully closed position. As best shown in FIG. 4, two microswitches S1 and S2 are mounted on door track member 57a. These switches have respective actuating arms A1 and A2 which are engaged by the door for actuation of the switches as the door is moved between its raised and fully lowered (or closed) positions.

As shown in FIG. 6, the hydraulic system of press P includes a pump 71 driven by an electric motor M. The pump supplies hydraulic fluid under pressure to a solenoid operated valve V. When valve V is energized, its spool is positioned to supply hydraulic fluid under pressure from the pump to the remainder of the hydraulic system of the press for operation of the latter. When the solenoid of valve V is deenergized, its spool shifts to dump the pressurized hydraulic fluid into the reservoir and thereby instantaneously to terminate operation of the press. The solenoid of valve V is energized by switches S1 and S2 which are serially connected thereto.

In FIG. 6, switch S1 is shown to be a normally closed switch and its actuating arm A1 is positioned relative to the upper edge of door 55 so that with the door in its fully closed position, its actuating arm is down and the switch is closed, and so that with the door even partly raised from its fully closed position, the actuating arm A1 is moved up to open switch S1. As the door is raised, the actuating arm rides on the door and switch S1 is maintained in its open position by the door. It is thus positively held open by the door and so long as the door is even partly raised, it is not possible to close switch S1. Switch S2 is a normally open switch and its actuating arm A2 is positioned adjacent the bottom edge of the door so as to be engaged by the door thereby to close switch S2 as the door moves to its fully closed position. Thus, only when the door is fully closed are both serially connected switches S1 and S2 closed so as to energize the solenoid of valve V and to supply hydraulic fluid under pressure to the remainder of the hydraulic system of press P. When the door is raised from its fully closed position, the upper edge of the door engages the downwardly biased actuating arm A1 of switch S1 thereby opening the later, and the bottom edge of the door moves clear of the upwardly biased actuating arm A2 of the lower switch S2 thereby permitting this switch to again assume its normally open position. Upon either of the switches S1 or S2 opening, the solenoid of valve V is deenergized, thus instantaneously dumping pressurized hydraulic fluid from the hydraulic fluid of the press and terminating operation of the press. While only one door actuable switch is necessary to operate the safety door of this invention so as to initiate operation of the press upon closing of the door and to instantaneously terminate operation of the press, the use of two serially connected switches positioned as above described is preferred because it prevents the safety aspects of the safety door being readily overcome by the press operator. As was heretofore mentioned, with door 55 even partially raised, the door positively holds switch S1 open. Thus, even though the operator may manually close switch S2, switch S1 may remain open to prevent operation of the press.

As shown in FIG. 4, guide tracks 57a, 57b are provided with a stop 72 for arresting downward movement of the door slightly above the level of top plate 3 of the press. Thus, in the event the operator's fingers are positioned below the bottom edge of the door when it is closed, the door will not fully strike the operator's hands and thus will not injure the operator. In the event the operator's fingers or hand prevents the door from fully closing, switches S1 and S2 will not close and thus operation of the press may not be initiated.

Safety apparatus 53 further includes screens or guards as generally indicated at 73a, 73b for preventing access by the press operator or by other personnel to the moving parts of press P. These safety guards are mounted on a plurality of vertical support rods 75 extending upwardly from top plate 3, there being one support rod at each corner of the top plate. A hollow, tubular sleeve 77 is slidably received on each rod 75 and is vertically movable therealong. As shown in FIG. 3, the two sleeves at the left side of press P are joined by side screen 79 which is notched to accommodate the side ram for the side platen of the press. A front screen 81 extends from the left front sleeve to close off the front of the press between door guide member 57a and the side screen and a rear screen 83 extends from the left rear support rod to close off the rear of the press between the rear ram and the left rear support rod. Screen members 79, 81 and 83 together with their respective guide sleeves are movable to constitute left screen 73a and are movable together as a unit on the support rods between a lowered position (FIG. 2) in which they block access to the movable parts of the machine and a raised retracted position (not shown) in which they permit access to the movable parts of the press. Likewise, a side screen 85, and front and rear screens 87 and 89 are secured to the guide sleeves at the right side of the press and thus constitute right screen 73b and are movable together as a unit on their respective support rods between a lowered guard position and a raised retracted position.

Each guide rod 75 has a groove 91 (see FIG. 5) near its upper end and each guide sleeve 77 has a spring loaded plunger 93 which rides on its respective support rod and which automatically engages groove 91 when the screen members and the guides are lifted to their raised retracted position thereby to hold the screen members in their raised retracted position. Thus, access to various parts of the machine may be readily gained so as to facilitate cleaning or repair of the press without having to completely remove the guard screens from the press. To lower the screen, the plungers are retracted and the screen members are then free to move downwardly on their respective support rods. It will be understood that microswitches (not shown) could optionally be provided which would prevent operation of the press P in the event the guard screens are not in their lowered guarding positions.

While safety apparatus 53 of this invention has been described in conjunction with a bacon press P to compress bacon slabs S, it will be understood that the safety apparatus of this invention may be used in conjunction with many other types of presses and with other types of machines in which it is necessary to guard the operator or other workmen from being injured by the machine.

In view of the above, it will be seen that the several objects of the invention are achieved and other advantageous results attained.

As various changes could be made in the above constructions without departing from the scope of the invention it is intended that all matter contained in the above description or shown in the accompanying drawings shall be interpreted as illustrative and not in a limiting sense.

What is claimed is:

1. Safety apparatus for a press or other machine, said press having one or more parts movable during operation thereof, said movable parts being capable of causing injury to the operator of the press in the event the operator inadvertently leaves his hands or other parts of his body in position where they may be contacted by the movable parts of the machine during operation, said safety apparatus comprising a door positioned between the movable parts of the press and the operator when the latter is in his normal position while operating the press and being movable from an open position in which the operator has access to the movable parts of the press for placement or removal of work from the press to a closed position in which access to the movable parts of the press is blocked, and means actuable by the door upon the door being moved to its closed position for initiating operation of the press and actuable by movement of the door from its closed position for terminating operation of the press, said door having handle means toward the operator and being thereby manually movable by the operator downwardly to its closed position and upwardly from its closed position during the operation of the press, said means actuable by said door comprising a pair of electrical switches serially connected together, a first of said switches being at the upper end of the door when in its closed position, the second of said switches being at the lower end of the door when in its closed position, said safety apparatus further comprising means for raising the door upon completion of an operating cycle of the press.

2. Safety apparatus for a press such as a press for compressing slabs of bacon or the like, said press having an operator's station where an operator normally stands during operation of the press, said press having a plurality of platens defining a chamber in which a slab of bacon may be compressed or molded, at least one of said platens being movable relative to the other platens thereby to compress the slab of bacon, said press further having means for ejecting a slab of molded bacon from the front of said chamber toward the operator's station, said safety apparatus comprising a door, means mounting the door on said press between said operator's station and said platens for movement between an open position in which the operator may readily have access to said chamber for placement therein of a slab of bacon to be pressed and in which a molded slab of bacon may be removed from the press, and a closed position in which the operator's access to the platens and the chamber is blocked, means actuable by said door upon movement of the door to its fully closed position for initiating an operating cycle of the press, this last said means also being actuable upon movement of the door from its fully closed position instantaneously to terminate operation of the press, said door having handle means toward the operator and being thereby manually movable by the operator downwardly to its closed position and upwardly from its closed position during the operation of the press, said safety apparatus further comprising means for automatically moving the door from its closed to its open position upon completion of a pressing cycle of the press, thereby to enable said ejecting means to at least partially eject a molded slab of bacon from said chamber.

3. Safety apparatus for a press such as a press for compressing slabs of bacon or the like, said press having an operator's station where an operator normally stands during operation of the press, said press having a plurality of platens defining a chamber in which a slab of bacon may be compressed or molded, at least one of said platens being movable relative to the other platens thereby to compress the slab of bacon, said press further having means for ejecting a slab of molded bacon from the front of said chamber toward the operator's station, said safety apparatus comprising a door, means mounting the door on said press between said operator's station and said platens for movement between an open position in which the operator may readily have access to said chamber for placement therein of a slab of bacon to be pressed and in which a molded slab of bacon may be removed from the press, and a closed position in which the operator's access to the platens and the chamber is blocked, means actuable by said door upon movement of the door to its fully closed position for initiating an operating cycle of the press, this last said means also being actuable upon movement of the door from its fully closed position instantaneously to terminate operation of the press, said safety apparatus further comprising means for automatically moving the door from its closed to its open position upon completion of a pressing cycle of the press, thereby to enable said ejecting means to at least partially eject a molded slab of bacon from said chamber, and safety screen means substantially closing off access to said platens and to said chamber, said safety screen means comprising a plurality of generally vertical supports secured to said press, a sleeve slidably received on each of said supports, one or more screen members rigidly secured to each of said sleeves, each of said sleeves with its respective screen member or members secured thereto being vertically movable on its support from a lowered position in which access to the platens and to the other chamber of the press is blocked and a raised position providing for access to the platens and the chamber, each of said sleeves having releasable locking means engageable with said support member so as to lock said sleeve and its respective screen members in their raised position.

4. Safety apparatus as set forth in claim 3 wherein said locking means comprises a spring loaded latching member biased inwardly toward said support, the latter being structured to receive said latching member when said safety screen is in its raised position.

5. Safety apparatus as set forth in claim 3 wherein said means actuable by said door comprises a pair of electrical switches serially connected together, a first of said switches being at the upper end of the door when in its closed position, the second of said switches being at the lower end of the door when in its closed position.

6. Safety apparatus as set forth in claim 5 further comprising means for releasably securing said door in its raised position.

7. Safety apparatus as set forth in claim 6 wherein said door securing means comprises a spring latch resiliently engageable with said door when the latter is in its raised position.

8. Safety apparatus for a press such as a press for compressing slabs of bacon or the like, said press having an operator's station where an operator normally stands during operation of the press, said press having a plurality of platens defining a chamber in which a slab of bacon may be compressed or molded, at least one of said platens being movable relative to the other platens thereby to compress the slab of bacon, said press further having means for ejecting a slab of molded bacon from the front of said chamber toward the operator's station, said safety apparatus comprising a door, means mounting the door on said press between said operator's station and said platens for movement between an open position in which the operator may readily have access to said chamber for placement therein of a slab of bacon to be pressed and in which a molded slab of bacon may be removed from the press, and a closed position in which the operator's access to the platens and the chamber is blocked, means actuable by said door upon movement of the door to its fully closed position for initiating an operating cycle of the press, this last said means also being actuable upon movement of the door from its fully closed position instantaneously to terminate operation of the press, said safety apparatus further comprising means for automatically moving the door from its closed to its open position upon completion of a pressing cycle of the press, thereby to enable said ejecting means to at least partially eject a molded slab of bacon from said chamber, said means for raising said door comprising an air cylinder unit which when pressurized lifts said door and which when unpressurized permits said door to be manually lowered.

9. Safety apparatus for a press such as a press for compressing slabs of bacon or the like, said press having an operator's station where an operator normally stands during operation of the press, said press having a plurality of platens defining a chamber in which a slab of bacon may be compressed or molded, at least one of said platens being movable relative to the other platens thereby to compress the slab of bacon, said press further having means for ejecting a slab of molded bacon from the front of said chamber toward the operator's station, said safety apparatus comprising a door, means mounting the door on said press between said operator's station and said platens for movement between an open position in which the operator may readily have access to said chamber for placement therein of a slab of bacon to be pressed and in which a molded slab of bacon may be removed from the press, and a closed position in which the operator's access to the platens and the chamber is blocked, means actuable by said door upon movement of the door to its fully closed position for initiating an operating cycle of the press, this last said means also being actuable upon movement of the door from its fully closed position instantaneously to terminate operation of the press, said safety apparatus further comprising means for automatically moving the door from its closed to its open position upon completion of a pressing cycle of the press, thereby to enable said ejecting means to at least partially eject a molded slab of bacon from said chamber, said press having a hydraulic system for effecting movement of said movable platen so as to compress said bacon, said hydraulic system including an electrically actuated valve for supplying pressurized hydraulic fluid to said hydraulic system, said means actuable by said door comprising a pair of electrical switches serially connected together and to said valve, the latter being energized to supply said hydraulic fluid under pressure to said hydraulic system when both of said switches are closed and being deenergized to terminate the supply of hydraulic fluid under pressure to said hydraulic system when one or both of said switches are open.

10. Safety apparatus as set forth in claim 9 wherein each of said switches has an actuating arm, wherein a first of said switches is positioned relative to said door so that with the door in its fully lowered position the actuating arm of said first switch is above the upper edge of the door and the first switch is closed and with the door even partly raised from its fully closed position, the upper edge of the door engages the actuating arm of the first switch and opens said first switch, and wherein the second of said switches is positioned relative to said door so that with said door in its fully closed position, the actuating arm of the second switch is engaged by the door and the second switch is closed, and with the door raised even partially from its fully closed position, the actuating arm of the second switch opens the second switch.

* * * * *

UNITED STATES PATENT AND TRADEMARK OFFICE
CERTIFICATE OF CORRECTION

PATENT NO. : 4,179,987
DATED : December 25, 1979
INVENTOR(S) : Daniel Dohm, Jr.

It is certified that error appears in the above—identified patent and that said Letters Patent is hereby corrected as shown below:

Column 2, line 54, "Fig. 2" should read -- Fig. 3 --.
Column 9, line 54, "other chamber" should read -- chamber --.

Signed and Sealed this

Fifteenth Day of April 1980

[SEAL]

Attest:

SIDNEY A. DIAMOND

Attesting Officer         Commissioner of Patents and Trademarks